Figure 1:
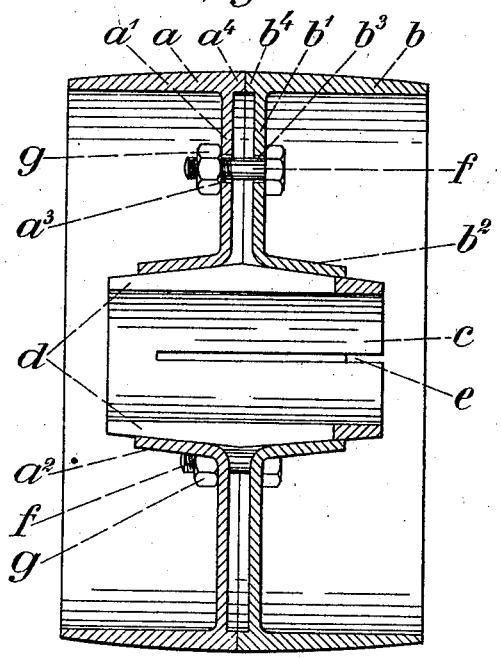

Jan. 6. 1925.

J. C. MARTINS

BELT PULLEY

Filed Oct. 23, 1923

1,521,823

INVENTOR
JENS CHRISTIAN MARTINS
BY
ATTORNEYS

Patented Jan. 6, 1925.

1,521,823

UNITED STATES PATENT OFFICE.

JENS CHRISTIAN MARTINS, OF COPENHAGEN, DENMARK, ASSIGNOR TO THE FIRM DEUTSCH-LUXEMBURGISCHE BERGWERKS- UND HÜTTEN-AKTIENGESELLSCHAFT, OF DORTMUND, GERMANY.

BELT PULLEY.

Application filed October 23, 1923. Serial No. 670,256.

*To all whom it may concern:*

Be it known that I, JENS CHRISTIAN MARTINS, a subject of the King of Denmark, residing at Titangade 1, Copenhagen, Denmark, have invented new and useful Improvements in Belt Pulleys; and I do hereby declare the following to be a full, clear, and exact description of the same.

The invention relates to a belt pulley consisting of two dishes the bottoms of which face each other and are clamped together, and is characterized by certain devices by which the pulley is secured on a shaft simultaneously with the tightening together of the two pulley halves in such a manner as will be explained below with reference to the drawing which shows a preferred embodiment of the invention.

Figure 1 shows an axial section through the belt pulley and

Figure 2:
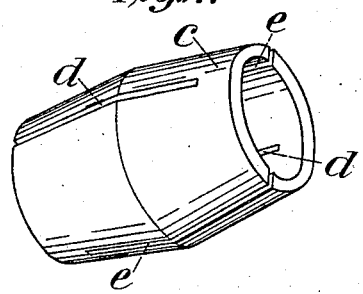

Figure 2 a perspective view of a clamping sleeve.

The pulley consists of two, preferably pressed dishes $a$ and $b$ having springy bottoms $a^1$ and $b^1$ respectively with hub parts $a^2$ and $b^2$, which are conical inside. In these hub part is inserted a springy double conical clamping sleeve $c$ which is cut up and by means of which the pulley can be secured on a shaft (not shown). Said sleeve has two diametrically opposed slits $d$ open at one end of the sleeve, and two other, likewise diametrically opposed, slits $e$, open at the other end of the sleeve.

In the bottoms $a^1$ and $b^1$ are found a number of circumferentially equidistant holes $a^3$ and $b^3$, which holes may accommodate bolts $f$ (or screws) so that the pulley halves can be tightened together by means of nuts $g$ until the edges $a^4$ and $b^4$ in the rim of the pulley abut. The bottoms will then still be at a certain distance from one another. By tightening together of the dishes and especially by further tightening of the nuts the hub parts $a^2$ and $b^2$ will by wedging action clamp together the double conical sleeve $c$ thus securing the same and thereby the entire pulley firmly to the shaft.

In lieu of the clamping sleeve shown with four slits a sleeve with one single through slit may be used if wanted, which, however, as a rule is not quite so appropriate.

Having thus fully described my invention I claim as new and desire to secure by Letters Patent:

1. A belt pulley comprising two dish shaped members, each having an outer annular flange and a bottom, the bottom of each member being constructed of springy material and terminating in a hub portion having a frustro-conical bore, the wider end of said bore being located adjacent to said bottom, the annular flange of each member projecting beyond the bottom thereof whereby said bottom and hub portions of said members will be held in spaced relationship when said members are clamped together with the bottom portions thereof facing towards each other, a double frustro-conical clamping sleeve adapted to fit within said frustro-conical bores, and means to clamp said members together upon said conical clamping sleeve.

2. A belt pulley comprising two dish shaped members, each having an outer annular flange and a bottom, the bottom of each member being constructed of springy material and terminating in a hub portion having a frustro-conical bore, the wider end of said bore being located adjacent to said bottom, the annular flange of each member projecting beyond the bottom thereof whereby said bottom and hub portions of said members will be held in spaced relationship when said members are clamped together with the bottom portions thereof facing towards each other, a double frustro-conical clamping sleeve of springly material adapted to fit within said frustro-conical bores, said clamping sleeve having a portion thereof cut out to permit contraction of its diametrical dimension and means to clamp said members together upon said conical clamping sleeve.

In testimony whereof I have affixed my signature in presence of two witnesses.

JENS CHRISTIAN MARTINS.

Witnesses:
CECIL V. SCHOU,
C. V. HÓGSTED.